US012350941B2

(12) United States Patent
Carrithers et al.

(10) Patent No.: US 12,350,941 B2
(45) **Date of Patent: *Jul. 8, 2025**

(54) NOZZLE SEALING TAPE

(71) Applicant: Brady Worldwide, Inc., Milwaukee, WI (US)

(72) Inventors: Adam D. Carrithers, Lexington, KY (US); Michael A. Marra, III, Lexington, KY (US); Richard L. Warner, Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,967

(22) Filed: May 30, 2024

(65) Prior Publication Data

US 2024/0316941 A1 Sep. 26, 2024

Related U.S. Application Data

(63) Continuation of application No. 17/818,961, filed on Aug. 10, 2022, now Pat. No. 12,023,935.

(51) Int. Cl.
*B41J 2/175* (2006.01)

(52) U.S. Cl.
CPC ......... *B41J 2/17536* (2013.01); *B41J 2/1753* (2013.01); *B41J 2/17533* (2013.01); *B41J 2/1754* (2013.01)

(58) Field of Classification Search
CPC .. B41J 2/17536; B41J 2/1753; B41J 2/17533; B41J 2/1754
See application file for complete search history.

(56) References Cited

U.S. PATENT DOCUMENTS

| | | | |
|---|---|---|---|
| 5,262,802 | A | 11/1993 | Karita et al. |
| 5,414,454 | A | 5/1995 | Reid |
| 6,481,825 | B1 | 11/2002 | Hinami et al. |
| 6,585,357 | B1 | 7/2003 | Nishimura |
| 6,588,875 | B1 | 7/2003 | Kleinhammer |
| 6,722,756 | B2 | 4/2004 | Choy et al. |
| 6,793,332 | B2 | 9/2004 | Kaga et al. |
| 6,929,363 | B2 | 8/2005 | Sakai et al. |
| 7,025,439 | B2 | 4/2006 | Laurer et al. |

(Continued)

FOREIGN PATENT DOCUMENTS

| | | | |
|---|---|---|---|
| CA | 2025561 | C | 7/1995 |
| EP | 0638426 | A1 | 2/1995 |

(Continued)

*Primary Examiner* — Geoffrey S Mruk
(74) *Attorney, Agent, or Firm* — Brianna Schonenberg

(57) ABSTRACT

A fluid fillable cartridge, a method for preventing contamination of nozzle holes in a fluid ejector chip and a method for making an adhesive sealing tape. The fluid fillable cartridge has an open fluid reservoir therein and a fluid ejector chip attached to an exposed surface of the fluid fillable cartridge opposite to the open fluid reservoir. An adhesive sealing tape is attached to the fluid fillable cartridge, wherein the adhesive sealing tape has an adhesive pattern on a first end of the adhesive sealing tape that is configured to attach the adhesive sealing tape adjacent to the fluid ejector chip while being devoid of adhesive in nozzle hole areas of the fluid ejector chip.

16 Claims, 8 Drawing Sheets

(56) References Cited

U.S. PATENT DOCUMENTS

| | | | |
|---|---|---|---|
| 7,350,898 B2 | 4/2008 | Lee | |
| 7,540,584 B2 | 6/2009 | Bertelsen et al. | |
| 7,850,285 B2 | 12/2010 | Yoshihira et al. | |
| 7,984,967 B2 | 7/2011 | Ikegame et al. | |
| 8,083,321 B2 | 12/2011 | Krawczyk et al. | |
| 8,496,320 B2 | 7/2013 | Foster et al. | |
| 9,132,654 B1 | 9/2015 | Dryer et al. | |
| 10,814,638 B2 | 10/2020 | Dryer et al. | |
| 11,571,691 B2 | 2/2023 | Carrithers et al. | |
| 12,023,935 B2 * | 7/2024 | Carrithers | B41J 2/17553 |
| 12,059,903 B2 | 8/2024 | Yabe | |
| 2002/0191056 A1 | 12/2002 | Ardito | |
| 2005/0029158 A1 | 2/2005 | Moore et al. | |
| 2006/0007282 A1 | 1/2006 | Lee | |
| 2006/0221119 A1 | 10/2006 | Bertelsen et al. | |
| 2008/0211870 A1 | 9/2008 | Owaki et al. | |
| 2009/0066771 A1 | 3/2009 | Mihara et al. | |
| 2011/0234700 A1 | 9/2011 | Kobayashi et al. | |
| 2017/0217195 A1 | 8/2017 | Arimura | |
| 2019/0344573 A1 | 11/2019 | Dryer et al. | |
| 2022/0009240 A1 | 1/2022 | Yabe | |
| 2022/0226806 A1 | 7/2022 | Carrithers et al. | |
| 2024/0316941 A1 | 9/2024 | Carrithers et al. | |
| 2025/0108622 A1 | 4/2025 | Schweitzer et al. | |

FOREIGN PATENT DOCUMENTS

| | | | |
|---|---|---|---|
| EP | 0761450 | B1 | 11/2000 |
| EP | 1103381 | A2 | 5/2001 |
| EP | 0803365 | B1 | 7/2001 |
| EP | 0729835 | B1 | 6/2003 |
| EP | 1095773 | B1 | 7/2003 |
| EP | 1551636 | B1 | 11/2008 |
| EP | 4321342 | A1 | 2/2024 |
| JP | S5865668 | A | 4/1983 |
| JP | H05330041 | A | 12/1993 |
| JP | H05338160 | A | 12/1993 |
| JP | H0664179 | A | 3/1994 |
| JP | H07137277 | A | 5/1995 |
| JP | 3151903 | B2 | 4/2001 |
| JP | 2005111974 | A | 4/2005 |
| JP | 3671555 | B2 | 7/2005 |
| JP | 2006137104 | A | 6/2006 |
| JP | 2006159513 | A | 6/2006 |
| JP | 2006198937 | A | 8/2006 |
| JP | 2007160864 | A | 6/2007 |
| JP | 2010005849 | A | 1/2010 |
| JP | 4902477 | B2 | 3/2012 |
| JP | 5020624 | B2 | 9/2012 |
| JP | 5178345 | B2 | 4/2013 |
| JP | 2014148176 | A | 8/2014 |
| JP | 5811378 | B2 | 11/2015 |
| JP | 6214286 | B2 | 10/2017 |
| JP | 2024149426 | A | 10/2024 |
| KR | 100385970 | B1 | 6/2003 |
| WO | 03/022589 | A1 | 3/2003 |
| WO | 2008/155946 | A1 | 12/2008 |
| WO | 2009136928 | A1 | 11/2009 |

* cited by examiner

NOZZLE SEALING TAPE

This application is a continuation of application Ser. No. 17/818,961, filed Aug. 10, 2022, which granted as U.S. Pat. No. 12,023,935 on Jul. 2, 2024.

TECHNICAL FIELD

The disclosure is directed to sealing tapes for ejection heads of fluid ejection cartridges. In particular, the disclosure is directed to a single-piece sealing tape with an adhesive pattern and structure that prevents residue from sticking to nozzles holes of a fluid ejector chip when the sealing tape is removed.

BACKGROUND AND SUMMARY

Conventional inkjet printheads are filled with a jetting fluid during manufacture of the fluid ejection cartridges prior the fluid ejection cartridges reaching the end-user. In order to prevent fluids leaking out of the ejection head attached to the fluid ejection cartridge during the fill process, nozzle holes of the fluid ejector chip are sealed with a specialized adhesive scaling tape that includes adhesive that covers the nozzle holes in the ejection head. To assist in removing the specialized adhesive sealing tape, a label, referred to as a "remove label," is adhered to the specialized adhesive sealing tape and is wrapped around a side of the fluid ejection cartridge. The distal end of the remove label typically has an area with no adhesive so that a user may easily grip and pull the remove label away from the fluid ejection cartridge, bringing with the label the specialized adhesive sealing tape. When the adhesive sealing tape is removed, some adhesive may remain in the nozzle holes. For inkjet printing applications, the adhesive remaining in the nozzle holes is easily removed during the printhead startup or cleaning operation. There is no concern about the adhesive contaminating the ink even if the adhesive is in contact with the ink through the nozzle holes.

However, for other applications, such as the jetting of fluids for life science applications, it is critical that no adhesive comes in contact with the fluids to contaminate the fluids. Accordingly, adhesive tapes coated with common adhesives cannot be placed over the nozzles of the fluid ejector chip used for life science fluid applications due to the risk of leaving residue/adhesive in the nozzle holes when the tape is removed. Much research has been conducted on specialized tape materials and adhesives that do not leave residues on the fluid ejector chip when removed therefrom. However, the degradation of the adhesives, due to aging or the adhesive reacting with life science fluids during a fluid cartridge filling process, has the potential to clog the nozzles and/or otherwise contaminate the fluid.

Moreover, with the use of fluid jet technology in the life sciences field and similar applications, it is becoming more common for the end user to provide and fill the fluid ejection cartridges with their own jetting fluid. Accordingly, since the fluid ejection cartridges are empty, an adhesive scaling tape for preventing the jetting fluid from flowing out of the nozzle holes is no longer a primary concern during shipping and handling of the fluid ejection cartridges. The primary concern that is in need of a solution is the prevention of contamination of the nozzle holes of the fluid ejector chip and the inside surfaces of the fluid reservoirs. Another area of concern is how to provide an adhesive sealing tape that is sufficiently protective of the fluid ejector chip and can be easily removed therefrom without damaging the fluid ejector chip. The invention herein seeks to eliminate the risk of adhesives clogging the nozzles, reduce the number of components necessary to assemble a finished fluid cartridge, and to provide versatility regarding scaling and protecting the fluid ejector chip and inside surfaces of the fluid reservoirs.

In view of the foregoing, embodiments of the disclosure provide a fluid fillable cartridge, a method for preventing contamination of nozzle holes in a fluid ejector chip and a method for making an adhesive sealing tape. The fluid fillable cartridge has an open fluid reservoir therein and a fluid ejector chip attached to an exposed surface of the fluid fillable cartridge opposite to the open fluid reservoir. An adhesive sealing tape is attached to the fluid fillable cartridge. The adhesive sealing tape has an adhesive pattern on a first end of the adhesive sealing tape that is configured to attach the adhesive sealing tape adjacent to the fluid ejector chip while being devoid of adhesive in nozzle hole areas of the fluid ejector chip.

In some embodiments, there is provided a method for preventing contamination of nozzle holes in a fluid ejector chip. The method includes providing a fluid fillable cartridge having an open fluid reservoir therein and the fluid ejector chip attached to an exposed surface of the fluid fillable cartridge opposite to the open fluid reservoir. An adhesive sealing tape is attached to the fluid fillable cartridge. The adhesive sealing tape is patterned with an adhesive on a first end of the backing material that is configured to attach the adhesive sealing tape adjacent to the fluid ejector chip while being devoid of adhesive in nozzle hole areas of the fluid ejector chip.

In some embodiments, there is provided a method for making an adhesive scaling tape for a fluid fillable cartridge. The method in includes providing a backing material for the adhesive scaling tape, wherein the backing material has a first end and a second end distal from the first end. An adhesive is applied to the first end of the backing material. The adhesive scaling tape has an adhesive pattern that is configured to attach the adhesive sealing tape adjacent to the fluid ejector chip while being devoid of adhesive in nozzle hole areas of the fluid ejector chip.

In some embodiments, the adhesive sealing tape includes an adhesive pattern on a second end of the adhesive sealing tape distal from the first end of the adhesive sealing tape that is configured to seal the open fluid reservoir in the fluid fillable cartridge.

In some embodiments, adhesive sealing tape is configured to wrap around a first side wall of the fluid fillable cartridge from the first end of the adhesive sealing tape to the second end of the adhesive sealing tape.

In some embodiments, the first end of the adhesive sealing tape is configured to overlap a second side wall of the fluid fillable cartridge.

In some embodiments, the adhesive pattern on the first end of the backing material is configured to attach the adhesive sealing tape to a body area of the fluid fillable cartridge adjacent to the fluid ejector chip.

In some embodiments, the adhesive pattern on the first end of the backing material is configured to avoid adhesive contact with the fluid ejector chip.

In some embodiments, the adhesive sealing tape is patterned on the first end of the backing material to attach the adhesive sealing tape to a body area of the fluid fillable cartridge adjacent to the fluid ejector chip without adhesive overlapping the fluid ejector chip.

An advantage of the disclosed embodiments is that the disclosed adhesive sealing tapes eliminate or greatly reduce the potential of clogging nozzle holes with an adhesive since there is no adhesive in direct contact with the nozzle holes. Accordingly, a single-piece adhesive sealing tape may be used to seal and protect the fluid fillable cartridge. The adhesive sealing tape may be modified to include a pull tab or may extend around to other sides of the fluid fillable cartridge to seal other features if necessary. Accordingly, the fluid fillable cartridge may be effectively sealed and protected from debris until ready for use, while also avoiding damage or reduced performance of the fluid ejector chip.

DETAILED DESCRIPTION

For the purposes of this disclosure, the term “label” may be used interchangeably with the term “tape.” The label is typically a polymeric, elastomeric, or fibrous-based backing material containing an adhesive layer for joining the label or adhesive sealing tape to a fluid ejection cartridge. A suitable backing material for the adhesive layer may be selected from thin film plastics such as a polyethylene terephthalate (PET), polyvinyl chloride (PVC), polyamide (PA), or synthetic paper such as YUPO FPG 80. The thickness of the backing material may range from about 20 to about 200 microns, preferably about 50 to about 70 microns.

Figure 1:
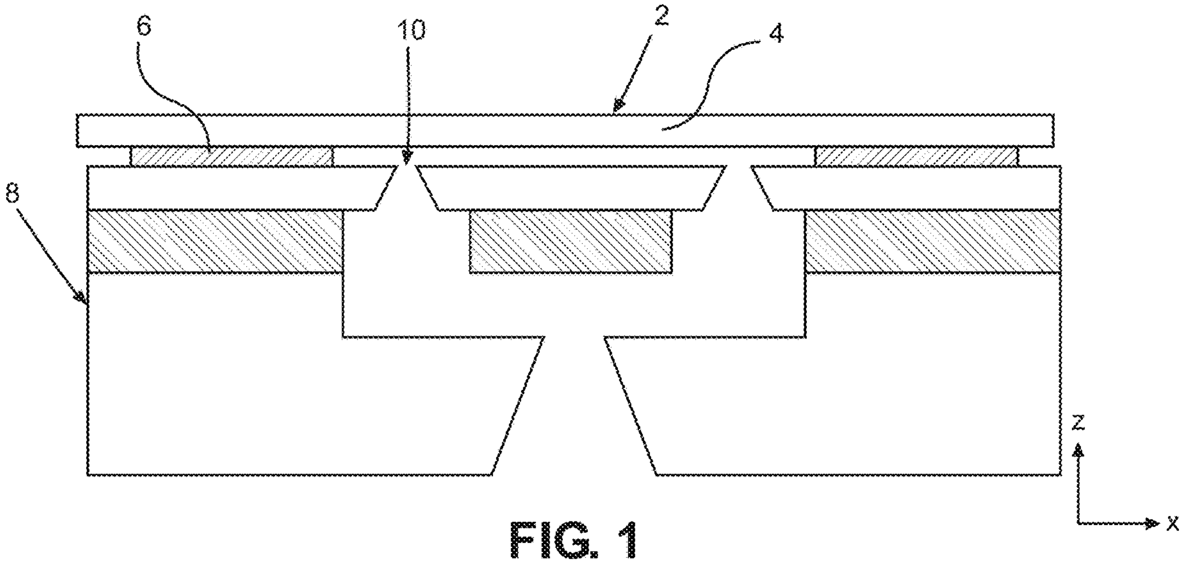
FIG. 1 is a cross-sectional view, not to scale of a fluid ejector chip containing an adhesive scaling tape according to a first embodiment of the disclosure.

Suitable adhesives used for adhesive sealing tapes, as described herein, may have an initial removal force of about 9 gram-force per centimeter of sealing tape width that increase to about 45 gram-force per centimeter or sealing tape width after two years. A particularly suitable adhesive material is either a silicone or acrylic adhesive. The thickness of adhesive applied to the backing material may range from about 5 to about 25 microns. A cross-sectional view of an adhesive sealing tape 2 containing a backing material 4 and an adhesive layer pattern 6 attached to a fluid ejector chip 8 having an array of nozzle holes 10 therein is illustrated in FIG. 1.

Figure 2:
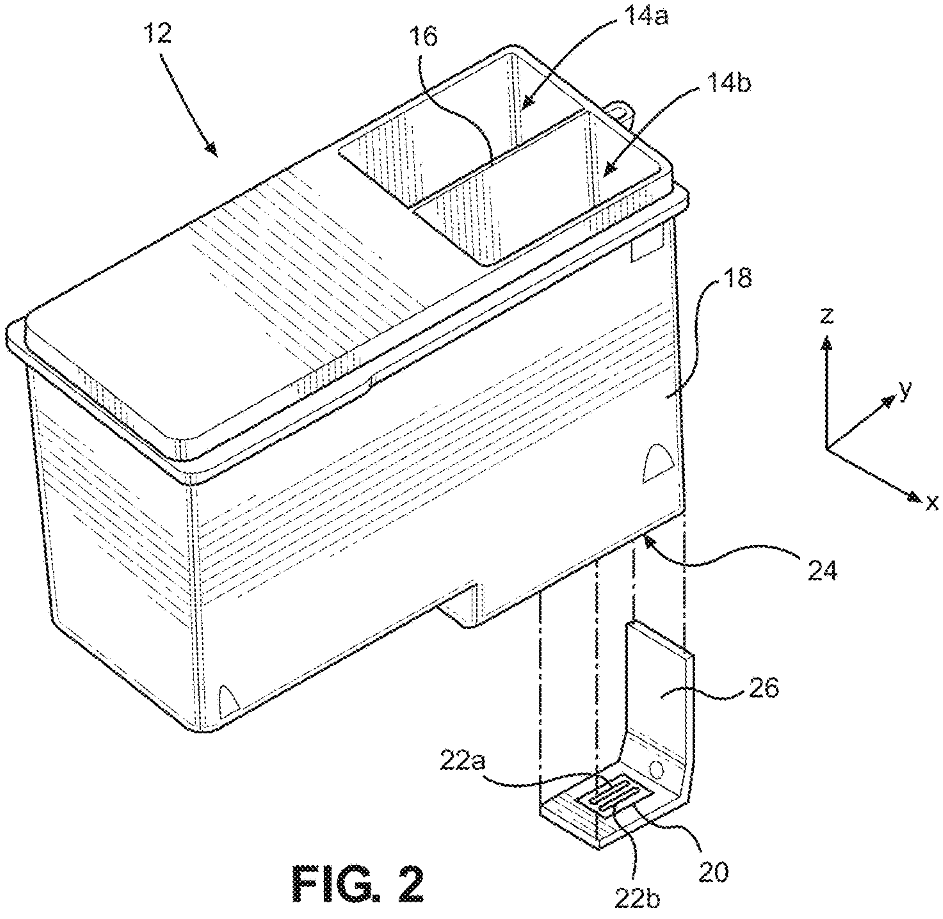
FIG. 2 is a perspective view, not to scale, of a fluid fillable cartridge containing two fluid reservoirs.
Figure 3:
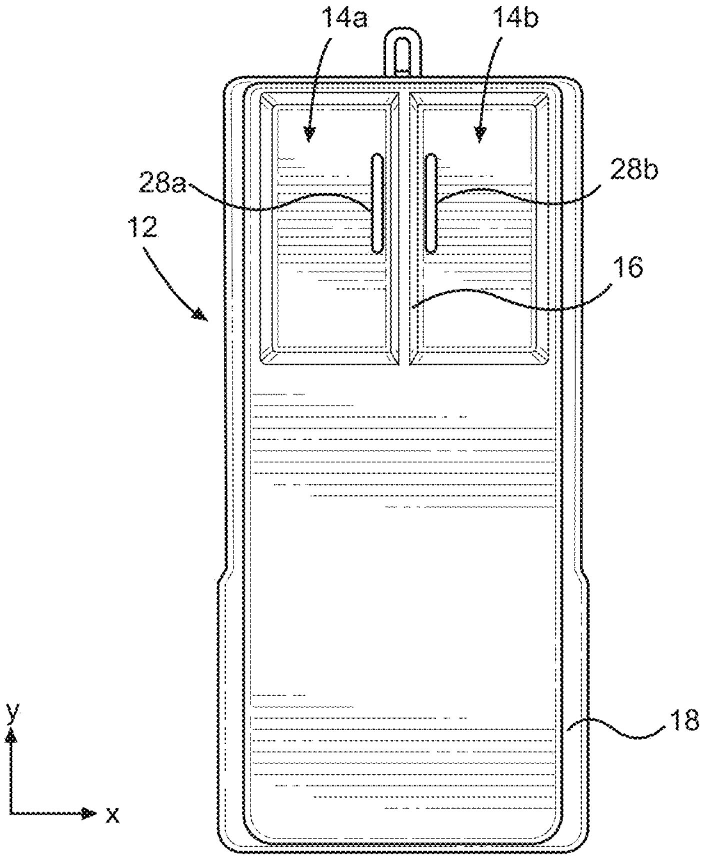
FIG. 3 is a top plan view, not to scale, of the fluid fillable cartridge of FIG. 2.

A fluid fillable cartridge 12 is illustrated in FIGS. 2 and 3. A fluid fillable cartridge is defined as a fluid cartridge containing one or more open-top fluid reservoirs. In this case, the fluid fillable cartridge 12 includes two open-top fluid reservoirs 14*a* and 14*b*. When the fluid fillable cartridge contains more than one open-top fluid reservoir, a dividing wall is provided between adjacent open-top reservoirs. In this case, the fluid fillable cartridge 12 includes one dividing wall 16 between the two fluid reservoirs 14*a* and 14*b*. The body 18 of the fluid fillable cartridge is typically a unitary molded body made of a polymeric material that is compatible with fluids inserted into the open-top fluid reservoirs 14*a* and 14*b*. However, a wide variety of other materials may be used for making the fluid fillable cartridges, including but not limited to glasses, ceramics, and metals.

A fluid ejector chip 20 containing arrays 22*a* and 22*b* of nozzle holes and fluid ejectors therefor is attached to an external surface 24 of the fluid fillable cartridge body by means of a flexible circuit 26. Referring again to FIG. 3, fluid supply slots 28*a* and 28*b* are provided in the open-top fluid reservoirs 14*a* and 14*b* to provide fluid from the reservoirs to the fluid ejector chip 20.

Figure 4:
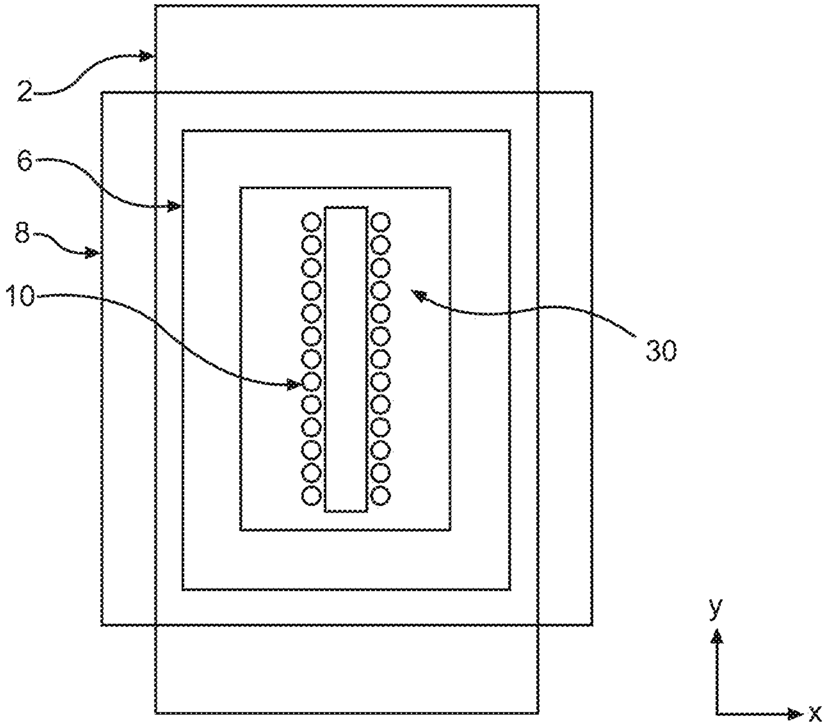
FIG. 4 is a plan view, not to scale, of an adhesive sealing tape as shown in FIG. 1 according to the first embodiment of the disclosure.
Figure 5:
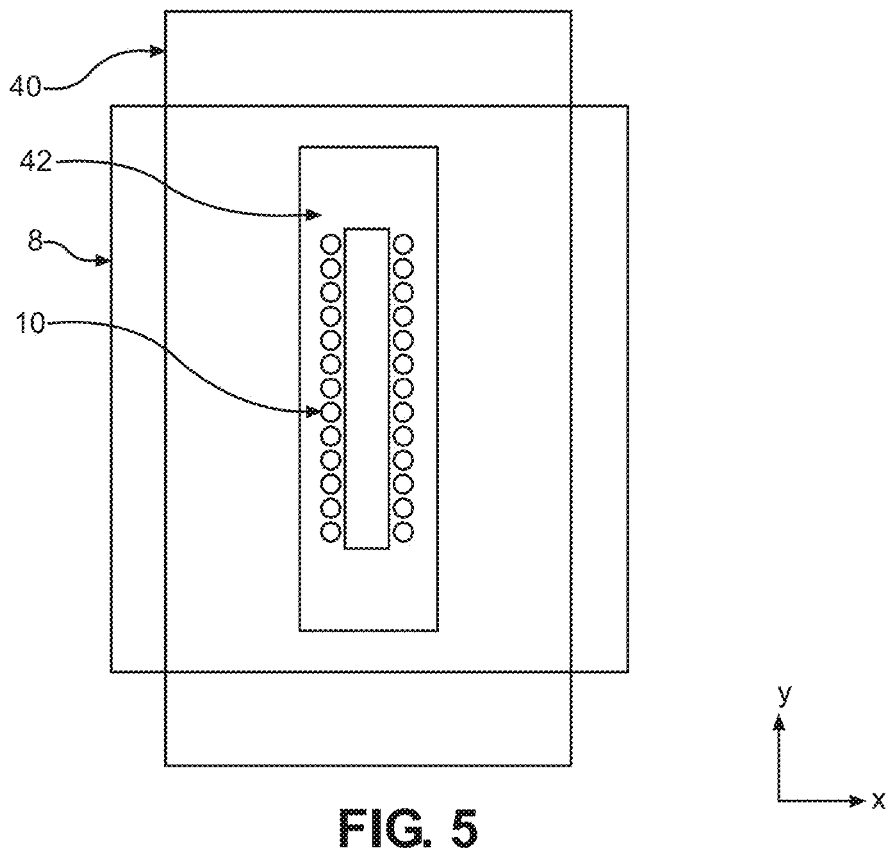
FIG. 5 is a plan view, not to scale, of an adhesive sealing tape according to a second embodiment of the disclosure.

In order to protect the nozzle holes from contamination and debris during shipping and handling of the fluid fillable cartridge 12, a protective adhesive sealing tape is attached to the fluid fillable cartridge 12. A first embodiment of the adhesive sealing tape 2 is illustrated in FIGS. 1 and 4. In this embodiment, the adhesive sealing tape 2 contains an adhesive layer pattern 6 that surrounds an array 10 of nozzle holes and fluid ejectors on the fluid ejector chip 8, but the adhesive scaling tape 2 is devoid of adhesive in the area 30 adjacent to the array 10 of nozzle holes. The adhesive of the adhesive sealing tape 2 is patterned in such a way that the adhesive does not overlap any of the array 10 of nozzle holes of the fluid ejector chip 8. The adhesive layer pattern 6 may be provided as a frame around the array 10 of nozzle holes as shown in FIG. 1, or the entire adhesive sealing tape 40 may have an adhesive layer pattern as shown in FIG. 5 provided there is no adhesive in the area 42 adjacent to the array 10 of nozzle holes.

Figure 6:
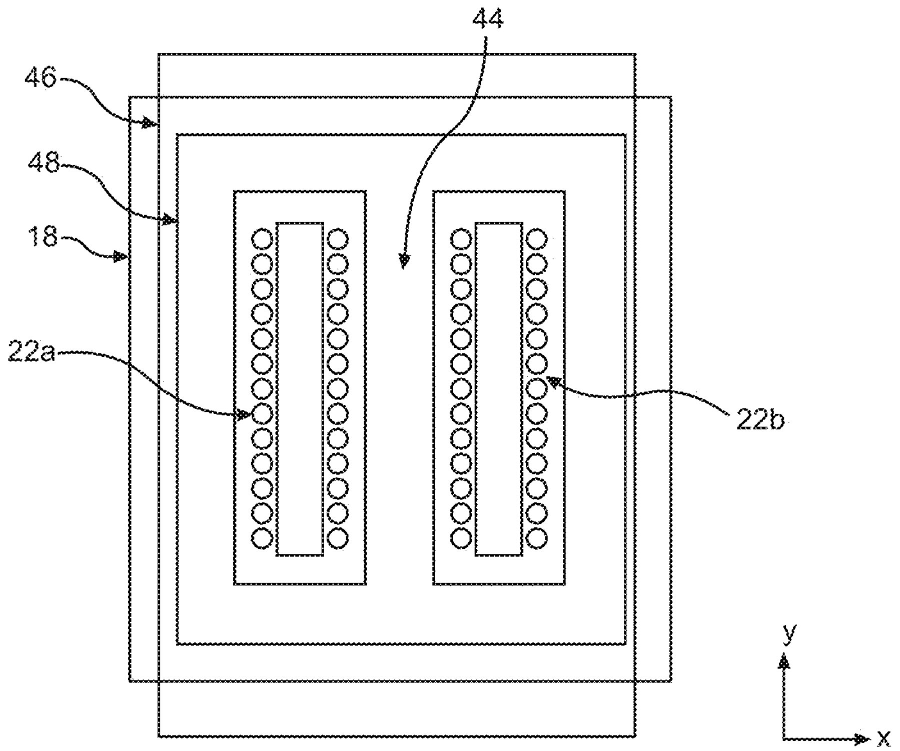
FIG. 6 is a plan view, not to scale, of an adhesive sealing tape according to a third embodiment of the disclosure.

In another embodiment, illustrated in FIG. 6, the fluid ejector chip 20 contains multiple arrays of nozzle holes and fluid ejectors therefor, such as arrays 22*a* and 22*b* of nozzle holes. In this embodiment, the adhesive sealing tape 46 contains an adhesive backing 48 that is patterned to isolate the arrays 22*a* and 22*b* of nozzle holes from one another by use of adhesive strip 44 between the arrays 22*a* and 22*b* of nozzle holes thereby preventing cross-contamination of fluids when the open-top reservoirs 14*a* and 14*b* contain different fluids.

Figure 7:
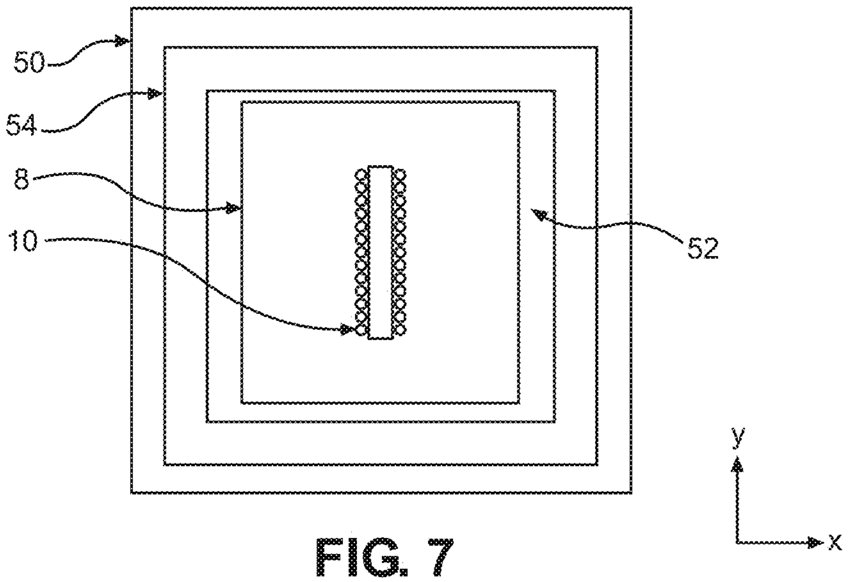
FIG. 7 is a plan view, not to scale, of an adhesive sealing tape according to a fourth embodiment of the disclosure.

Another embodiment is illustrated in FIG. 7. In this embodiment, the adhesive scaling tape 50 is cut to a size and shape so that the adhesive sealing tape covers a portion of the external surface 52 of the cartridge body beyond the area of the fluid ejector chip 8. The adhesive pattern 54 may be applied in such a way as to seal around the perimeter of the fluid ejector chip 8. This embodiment of the adhesive scaling tape 50 may be useful in cases where it is not necessary to fill the fluid fillable cartridge prior to reaching the end user, but it is still necessary to protect the fluid ejector chip 8 from contamination and debris. This embodiment may also allow a wider tolerance for placement of the adhesive sealing tape 50 on the cartridge body compared to the embodiments of FIGS. 4-6 thereby reducing assembly costs for the fluid fillable cartridge.

Figure 8:
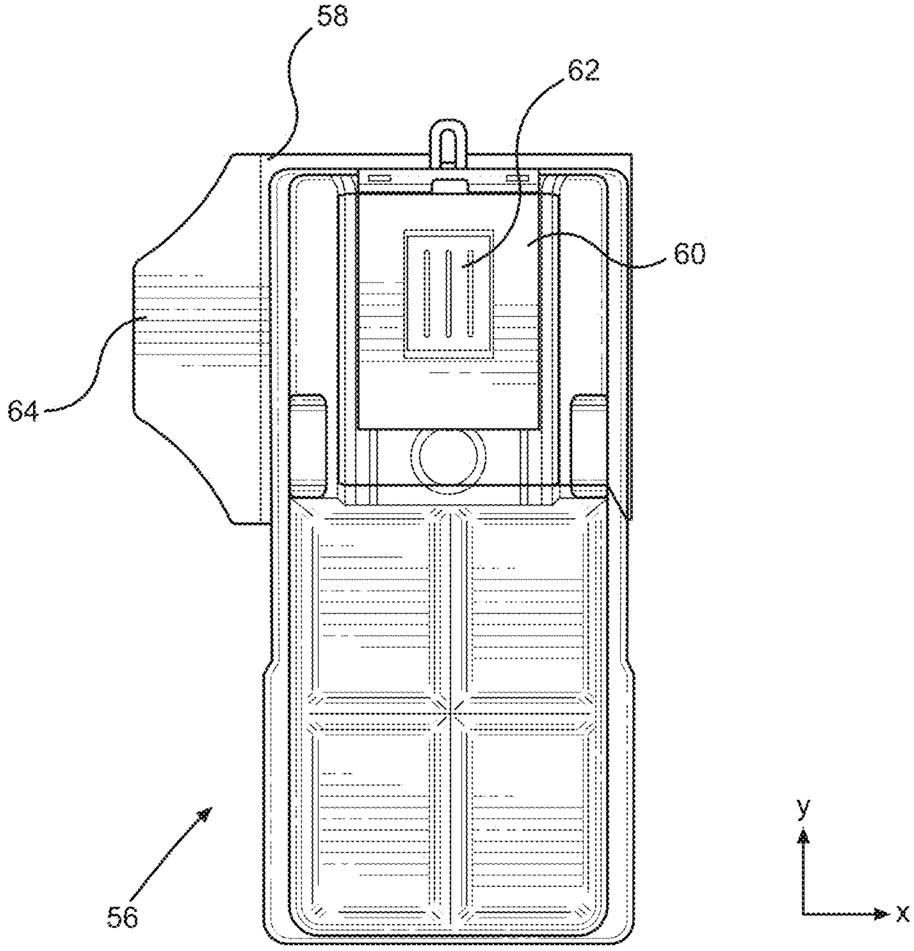
FIG. 8 is a bottom plan view, not to scale, of a fluid fillable cartridge containing an adhesive sealing tape according to a fifth embodiment of the disclosure.

FIG. 8 is a bottom side view of a fluid fillable cartridge 56 containing an adhesive scaling tape 58 with an adhesive pattern 60 that surrounds a fluid ejector chip 62 as described with reference to FIG. 7 wherein an area of the adhesive sealing tape 58 covering the fluid ejector chip 62 is devoid of adhesive. The adhesive scaling tape 58 may also be provided with a pull tab 64 that is also devoid of adhesive and may be used by a user to remove the adhesive sealing tape 58 from the fluid fillable cartridge 56. Accordingly, all of the adhesive sealing tapes described in the preceding embodiments may include an extra length of backing material that extends beyond the fluid ejector chip and has a non-adhesive area to use as the pull tab 64 to assist in removing the adhesive sealing tape from the cartridge. The length by which the backing material extends may be immediately beyond the adhesive or further so that the pull tab 64 may wrap around or extend past a side of the cartridge body to a more readily visible and convenient to the user.

Figure 9:
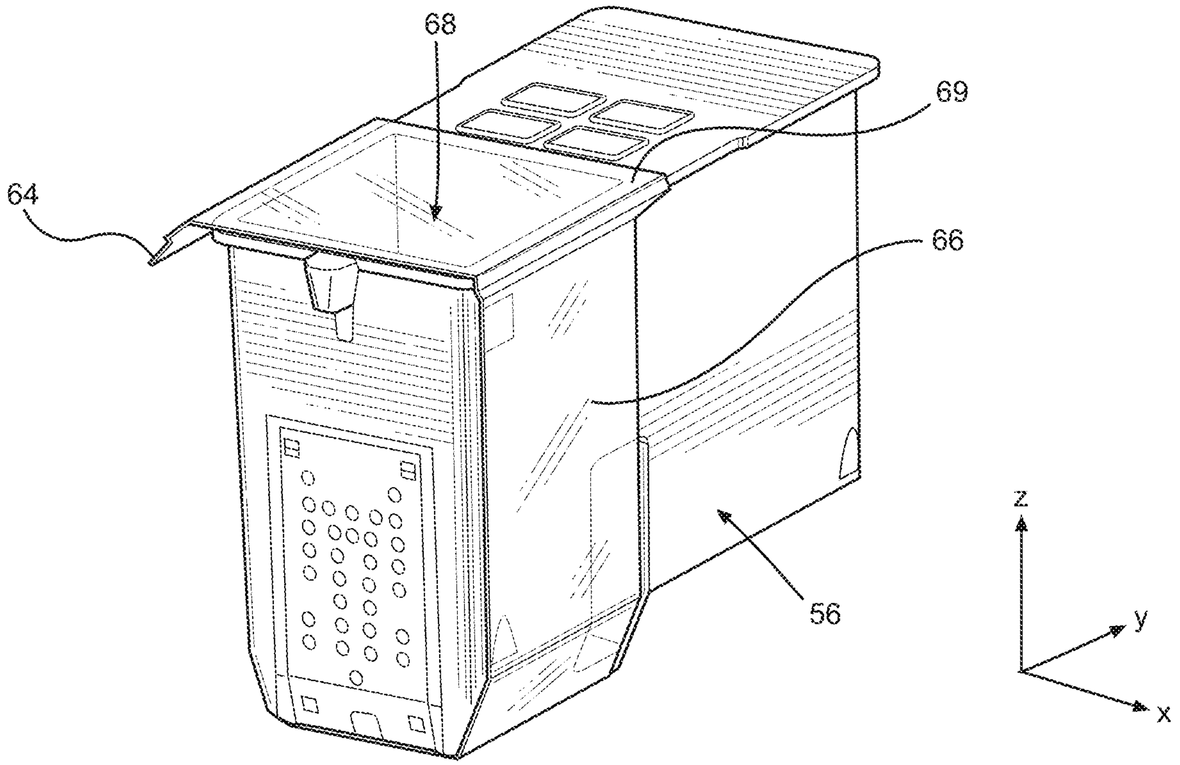
FIG. 9. is a top perspective view, not to scale, of a fluid fillable cartridge containing an adhesive sealing tape according to a sixth embodiment of the disclosure.
Figure 10:
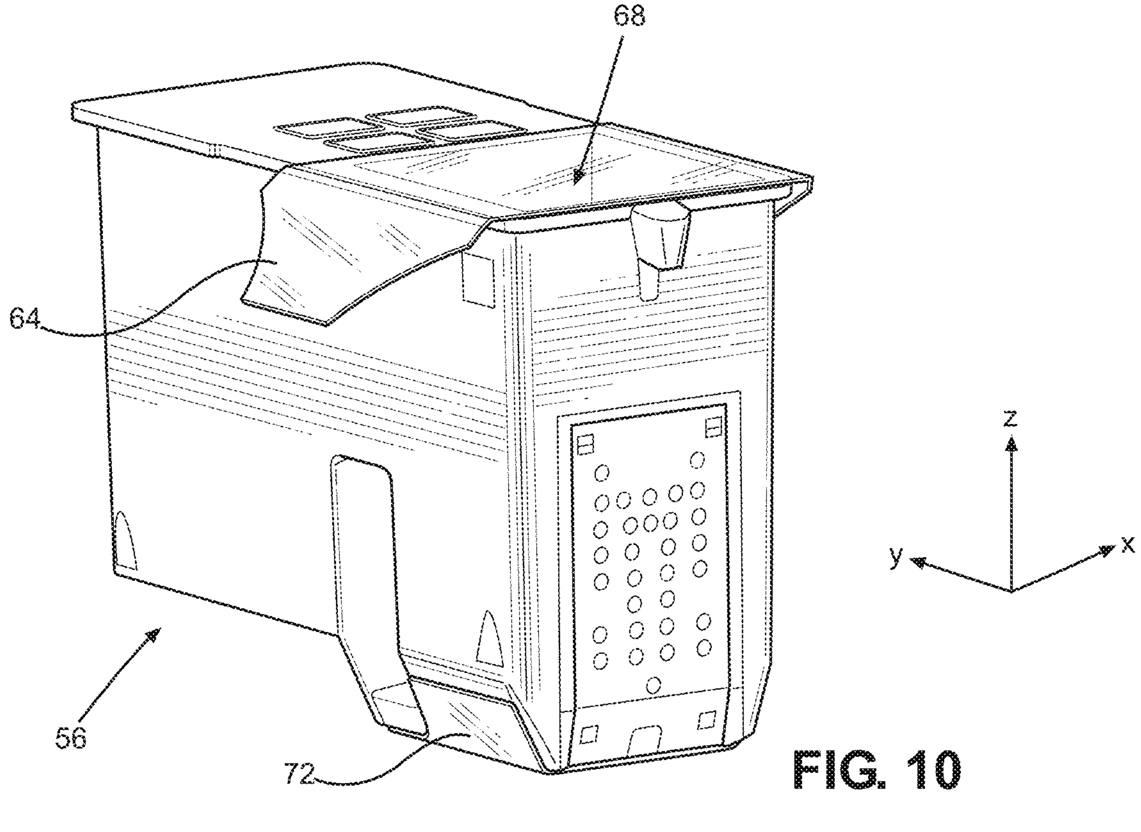
FIG. 10. is a top perspective view, not to scale, of a fluid fillable cartridge containing an adhesive sealing tape according to a seventh embodiment of the disclosure.

While the foregoing embodiments illustrate an adhesive sealing tape specifically configured to protect the fluid ejector chip from contamination and debris, the adhesive scaling tape may also be extended to cover other portions of the fluid fillable cartridge. FIG. 9 is a top perspective view of the fluid fillable cartridge 56, wherein an adhesive sealing tape 66 is extended to cover an open-top fluid reservoir 68 in the cartridge 56 to seal the open-top fluid reservoir 68 thereby preventing debris from collecting in the reservoir 68 during handling and shipping. The adhesive sealing tape 66 may include adhesive to attach the adhesive sealing tape to an edge 69 around the perimeter of the open top fluid reservoir 68 or adhesive may be applied to the entire area covering the open-top fluid reservoir 68. As described above, a pull tab 64 may also be included to assist in removing the adhesive sealing tape 66 from the cartridge 56. FIG. 9 illustrates the adhesive scaling tape 66 only attached to one side of the fluid fillable cartridge 56. However, as shown in FIG. 10, the adhesive sealing tape may have an extension 72 containing adhesive that attaches to a second side of the fluid fillable cartridge 56.

Figure 11:
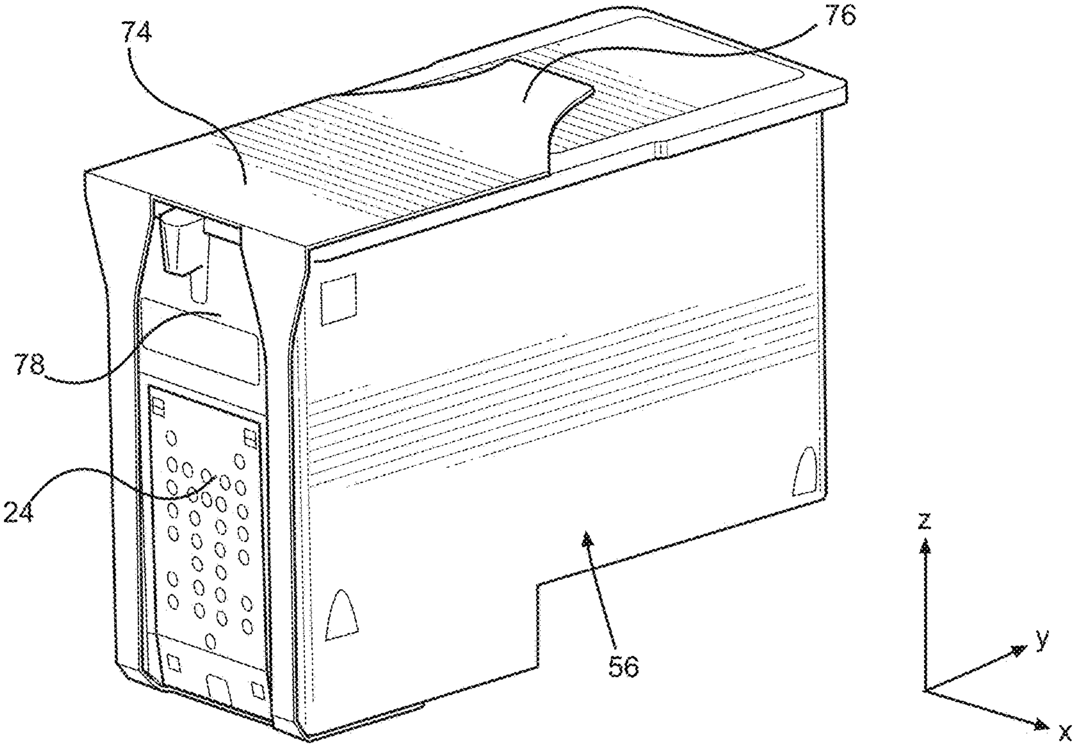
FIG. 11. is a top perspective view, not to scale, of a fluid fillable cartridge containing an adhesive sealing tape according to a eighth embodiment of the disclosure.
Figure 12:
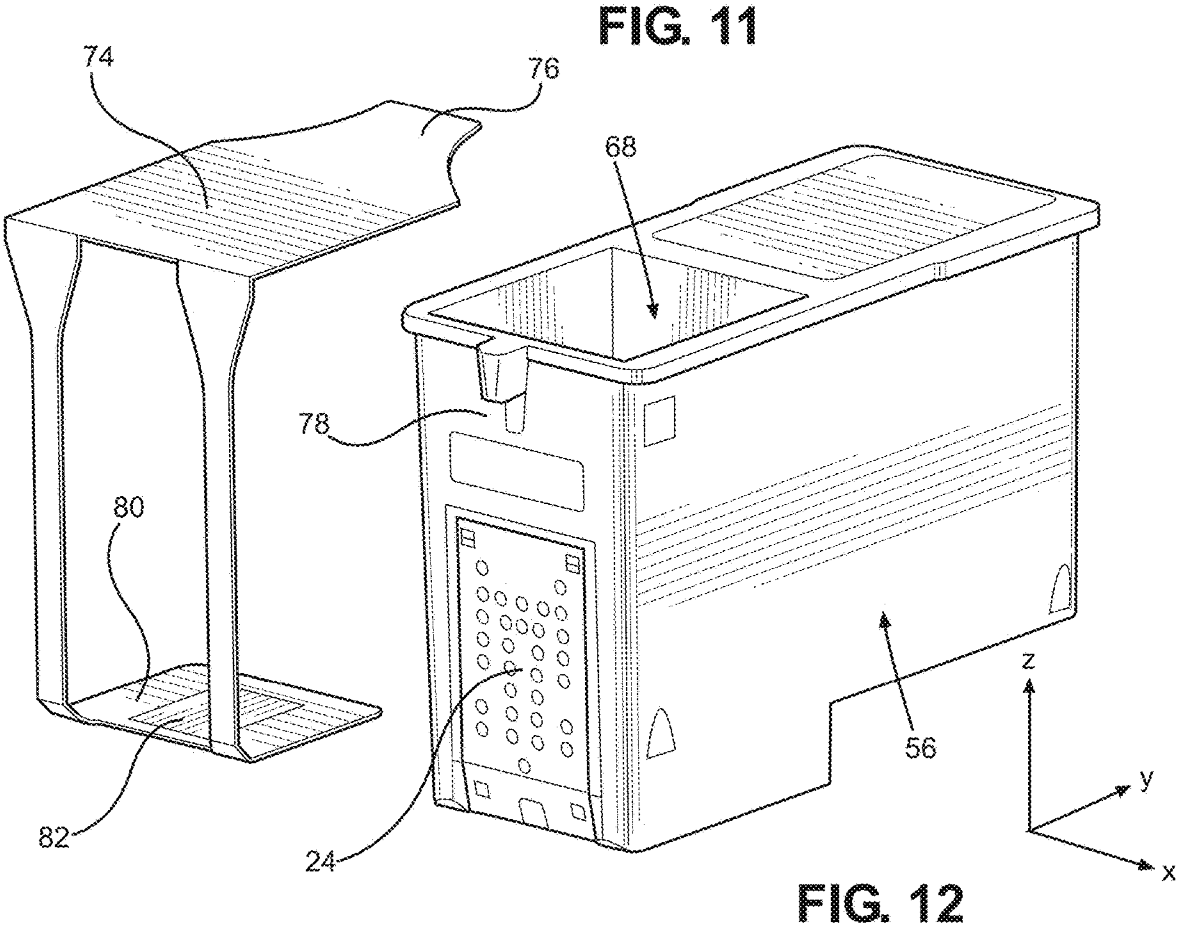
FIG. 12 is a top exploded view, not to scale, of the fluid fillable cartridge and adhesive sealing tape of FIG. 11.
Figure 13:
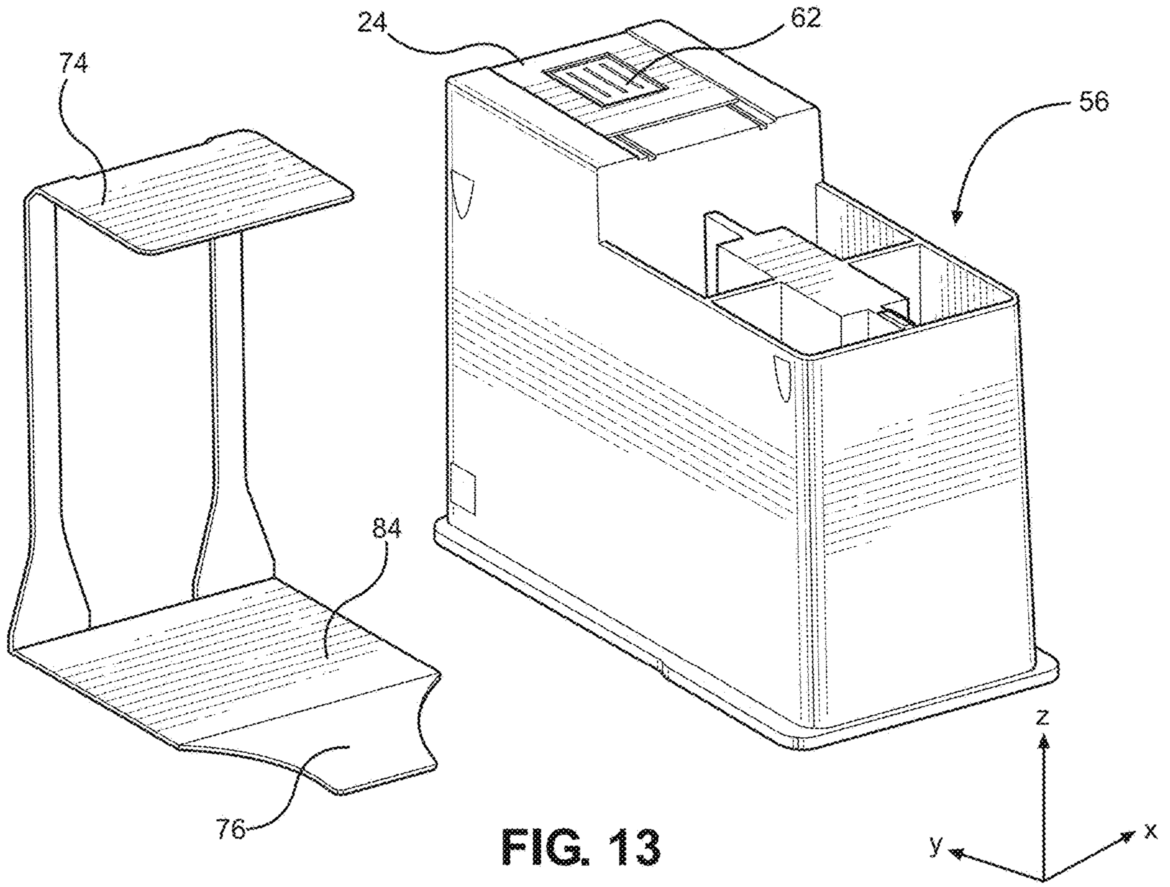
FIG. 13 is a bottom exploded view, not to scale, of the fluid fillable cartridge and adhesive sealing tape of FIG. 11.

In another embodiment illustrated in FIGS. 11-13, an adhesive sealing tape 74 having a pull tab 76 is cut so that the adhesive sealing tape is wrapped around a front side 78 of the fluid fillable cartridge without interfering with electrical connections on the flexible circuit 24 so that the electrical connections may be used to test the fluid ejector chip attached to the fluid fillable cartridge 56. FIG. 12 is an exploded top perspective view of the fluid fillable cartridge 56 and adhesive sealing tape 74 showing the pattern of adhesive 80 that surrounds the fluid ejector chip area 82 that is devoid of adhesive. FIG. 13 is an exploded bottom perspective view of the fluid fillable cartridge 56 and adhesive sealing tape 74 showing the pattern of adhesive 84 that covers the open-top fluid reservoir 68.

Figure 14:
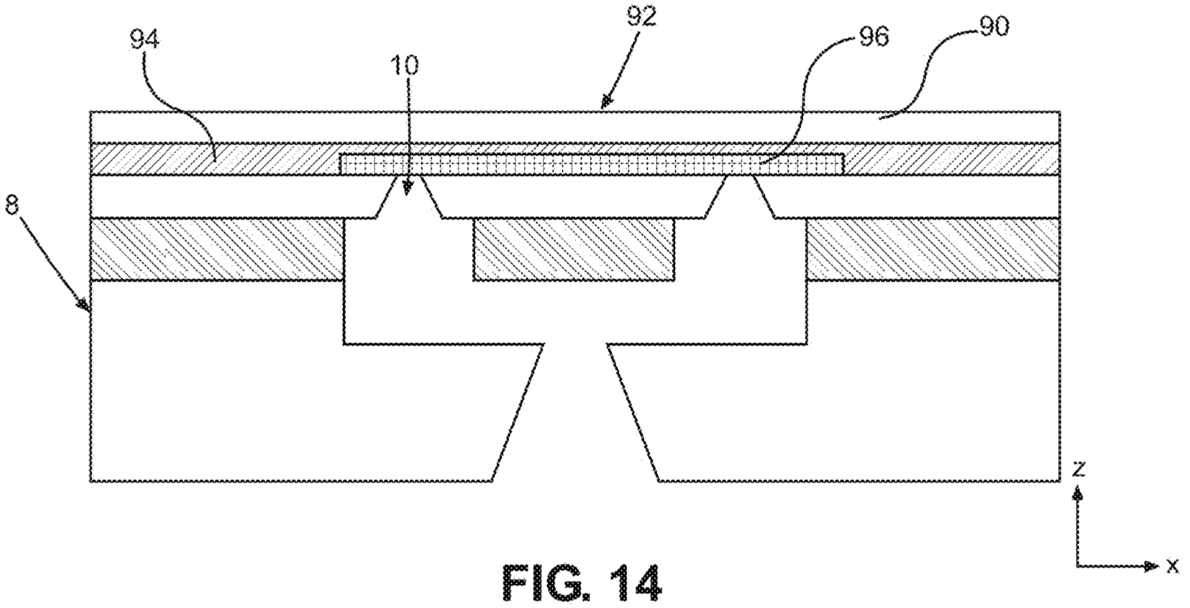
FIG. 14 is a cross-sectional view, not to scale of a fluid ejector chip containing an adhesive sealing tape according to a ninth embodiment of the disclosure.

In some embodiments, as illustrated in FIG. 14, an entire backing material 90 used for the adhesive sealing tape 92 is covered with adhesive 94. In areas of the adhesive sealing tape that would be in contact with the nozzle holes 10 of the fluid ejector chip 8, a buffer material 96 may be applied to a portion of the adhesive sealing tape 92 adjacent to the nozzle holes 10. The buffer material 96 is non-adhesive and may prevent any residue from contacting the nozzle holes.

In some embodiments, an adhesive preform is applied to the fluid fillable cartridge so that the adhesive preform surrounds the nozzle holes in the fluid ejector chip without overlapping the nozzle holes. A backing material is then applied to the adhesive preform to act as a seal to prevent debris and contamination from contacting the nozzle holes and to act as a seal for the fluid ejector chip. The adhesive preform is cut in such a way that when applied to the fluid ejector chip that the adhesive preform forms a window around the nozzle holes similar to the adhesive pattern of FIGS. 1 and 3-4, with no adhesive contacting the nozzle holes. The backing material applied to the adhesive preform is devoid of adhesive.

Figure 15:
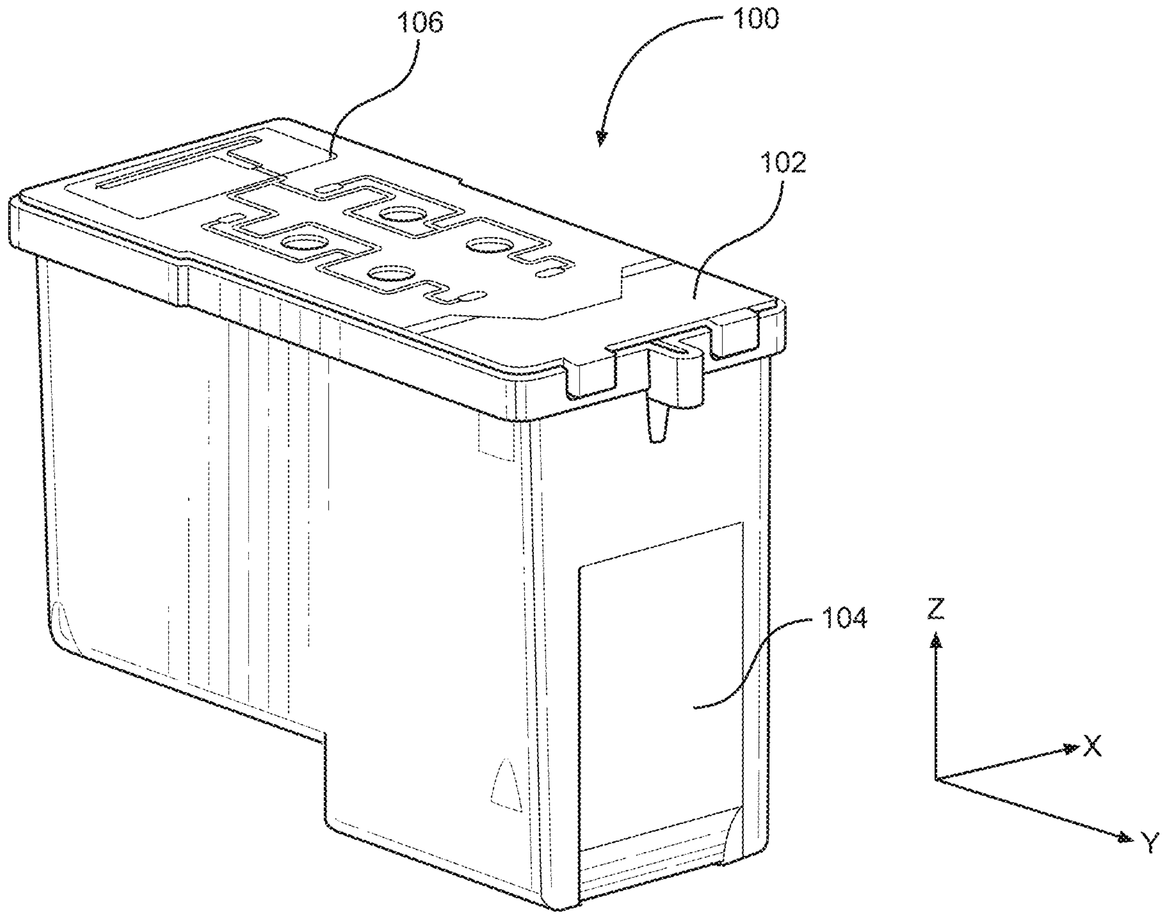
FIG. 15, is a top perspective view of fluid fillable cartridge having a cover containing air vents therein.

In some embodiments, as illustrated for example in FIG. 15, a fluid fillable cartridge 100 includes a cover 102 attached to the cartridge body 104. The cover 102 includes air vents 106 for preventing a backpressure in the fluid fillable cartridge during fluid ejection. When the fluid fillable cartridge 100 contains a cover 102 with air vents therein, an adhesive sealing tape may also be extended over the cover 102 to cover and protect the air vents 106 from debris during shipping and handling of the fluid fillable cartridge 100.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid cartridge having a fluid reservoir therein and a fluid ejector chip having nozzle hole areas thereon, wherein the ejector chip is attached to the fluid cartridge in fluid flow communication with the fluid reservoir, the fluid cartridge further comprising an adhesive sealing tape attached to the fluid cartridge, wherein the adhesive sealing tape comprises a first end, a second end distal from the first end, and an adhesive on a backing material wherein the first end of adhesive sealing tape is configured to cover without contacting the nozzle hole areas of the ejector chip and wherein the backing material has an adhesive pattern that is configured to attach the adhesive sealing tape adjacent to the fluid ejector chip while being devoid of adhesive in nozzle hole areas of the fluid ejector chip.

2. The fluid cartridge of claim 1, wherein the adhesive sealing tape further comprises an adhesive pattern on the second end of the adhesive sealing tape that is configured to attach to a cover of the fluid cartridge.

3. The fluid cartridge of claim 2, wherein the adhesive sealing tape is configured to wrap around a first side wall of the fluid cartridge from the first end of the adhesive sealing tape to the second end of the adhesive sealing tape.

4. The fluid cartridge of claim 3, wherein the first end of the adhesive sealing tape is configured to overlap a second side wall of the fluid cartridge.

5. The fluid cartridge of claim 1, wherein the adhesive pattern on the first end of the adhesive sealing tape is configured to attach the sealing tape to a body area of the fluid cartridge adjacent to the fluid ejector chip.

6. The fluid cartridge of claim 5, wherein the adhesive pattern on the first end of the adhesive sealing tape is configured to avoid adhesive contact with the nozzle hole areas of the fluid ejector chip.

7. A method for preventing contamination of nozzle hole areas of a fluid ejector chip, comprising:

providing a fluid cartridge having a fluid reservoir therein and wherein the fluid ejector chip is attached to the fluid cartridge in fluid flow communication with the fluid reservoir, and attaching an adhesive sealing tape to the fluid cartridge, wherein the adhesive sealing tape has a first end and a second end distal from the first end, and an adhesive on a backing material, and wherein the first end of the adhesive sealing tape is configured to cover without contacting the nozzle hole areas of the fluid ejector chip and wherein the backing material has an adhesive pattern that is configured to attach the adhesive sealing tape adjacent to the fluid ejector chip while being devoid of adhesive in the nozzle hole areas of the fluid ejector chip.

8. The method of claim 7, wherein the adhesive sealing tape comprises an adhesive pattern on the second end of the adhesive sealing tape that is configured to attach to a cover of the fluid cartridge.

9. The method of claim 8, further comprising wrapping the adhesive sealing tape around a first side wall of the fluid cartridge from the first end of the adhesive sealing tape to the second end of the adhesive sealing tape.

10. The method of claim 9, wherein the first end of the adhesive sealing tape is configured to overlap a second side wall of the fluid cartridge.

11. The method of claim 7, wherein the adhesive sealing tape is patterned on the first end of the adhesive sealing tape to a body area of the fluid cartridge adjacent to the fluid ejector chip without adhesive overlapping the fluid ejector chip.

12. A method for making an adhesive sealing tape for a fluid cartridge having a fluid ejector chip attached thereto, the method comprising:

providing a backing material for the adhesive sealing tape, wherein the backing material has a first end and a second end distal from the first end, and applying an adhesive to the first end of the backing material, wherein the adhesive sealing tape has an adhesive pattern that is configured to attach the adhesive sealing tape adjacent to the fluid ejector chip so that the backing material covers without contacting nozzle hole areas of the fluid ejector chip while being devoid of adhesive in the nozzle hole areas of the fluid ejector chip.

13. The method of claim 12, further comprising applying an adhesive pattern to a second end of the backing material distal from the first end of the backing material that is configured to attach to a cover of the fluid cartridge.

14. The method of claim 13, further comprising wrapping the adhesive sealing tape around a first side wall of the fluid cartridge from the first end of the backing material to the second end of the backing material.

15. The method of claim 14, wherein the first end of the adhesive sealing tape is configured to overlap a second side wall of the fluid cartridge.

16. The method of claim 12, wherein the backing material is patterned with adhesive on the first end of the backing material wherein the adhesive pattern is sufficient to attach the adhesive sealing tape to a body area of the fluid cartridge adjacent to the fluid ejector chip without adhesive overlapping the nozzle hole areas of the fluid ejector chip.

* * * * *